(12) United States Patent
Matsukawa et al.

(10) Patent No.: US 7,520,175 B2
(45) Date of Patent: Apr. 21, 2009

(54) STRAIN SENSOR

(75) Inventors: Yasunori Matsukawa, Fukui (JP);
Toshiharu Motofusa, Fukui (JP);
Yasunobu Kobayashi, Fukui (JP);
Akira Matsuura, Osaka (JP)

(73) Assignee: Panasonic Corporation, Osaka (JP)

( * ) Notice: Subject to any disclaimer, the term of this patent is extended or adjusted under 35 U.S.C. 154(b) by 337 days.

(21) Appl. No.: 10/585,847

(22) PCT Filed: Feb. 23, 2004

(86) PCT No.: PCT/JP2004/002071

§ 371 (c)(1),
(2), (4) Date: Jul. 12, 2006

(87) PCT Pub. No.: WO2005/080931

PCT Pub. Date: Sep. 1, 2005

(65) Prior Publication Data

US 2008/0229841 A1    Sep. 25, 2008

(51) Int. Cl.
*G01B 7/16* (2006.01)
(52) U.S. Cl. .................................................. 73/774
(58) Field of Classification Search .......... 73/760–774
See application file for complete search history.

(56) References Cited

U.S. PATENT DOCUMENTS

| | | | | |
|---|---|---|---|---|
| 5,233,913 A | * | 8/1993 | Muirhead | 92/71 |
| 5,272,894 A | * | 12/1993 | Stillwagon et al. | 70/208 |
| 5,527,240 A | * | 6/1996 | Chen | 482/44 |
| 5,913,647 A | * | 6/1999 | Hodge | 411/11 |
| 6,677,539 B2 | | 1/2004 | Miura et al. | |
| 6,969,809 B2 | * | 11/2005 | Rainey | 177/136 |
| 2005/0034528 A1 | * | 2/2005 | Matsuura et al. | 73/774 |

FOREIGN PATENT DOCUMENTS

| | | |
|---|---|---|
| JP | 55-115616 | 9/1980 |
| JP | 5-57605 | 7/1993 |
| JP | 2002-90232 | 2/2002 |
| JP | 2003-083707 | 3/2003 |
| JP | 2004-069535 | 3/2004 |

\* cited by examiner

*Primary Examiner*—Max Noori
(74) *Attorney, Agent, or Firm*—Wenderoth, Lind & Ponack, L.L.P.

(57) ABSTRACT

A fixing member is composed of an upper washer and a lower washer; and a sensor substrate is sandwiched and held by the upper and lower washers. A strain-detecting element is disposed on the sensor substrate. A strain sensor as configured above is fixed onto a measurement target via the fixing member. Accordingly, the strain sensor does not generate an output signal when no external force is applied, demonstrating stable characteristics.

20 Claims, 8 Drawing Sheets

STRAIN SENSOR

This application is a U.S. national phase application of PCT Internation Application PCT/JP2004/002071.

TECHNICAL FIELD

The present invention relates to a strain sensor for detecting strain caused by external forces, such as human weight and vehicle weight, using a strain-detecting element provided on a sensor substrate.

BACKGROUND ART

A conventional strain sensor is disclosed in Japanese Utility Model Unexamined Publication No. H5-57605, and is described below with reference to drawings.

Figure 8:
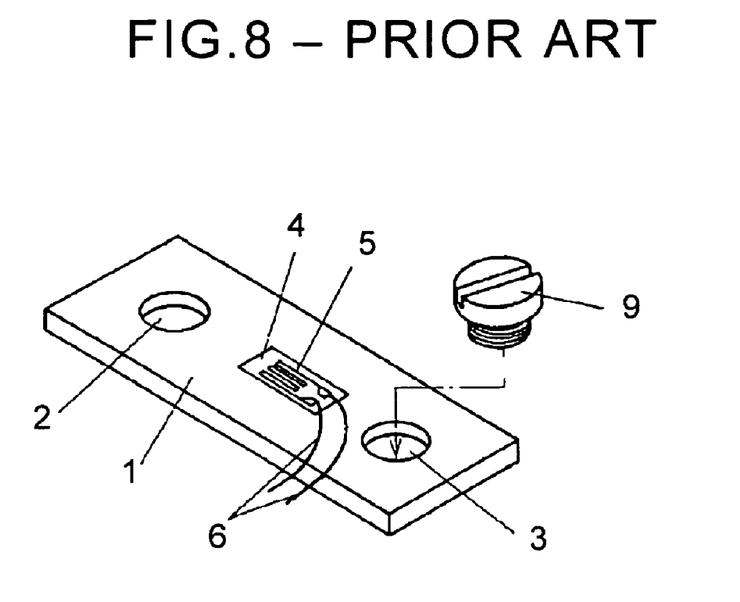
FIG. 8 is a perspective view of a conventional strain sensor.
Figure 9:
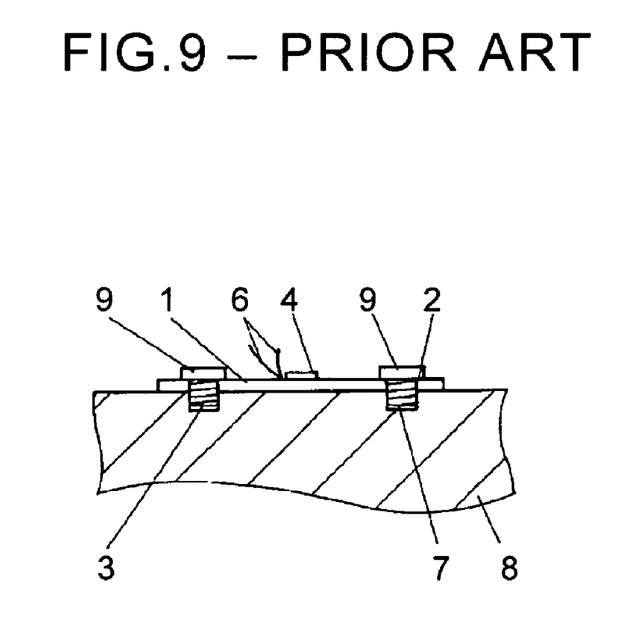
FIG. 9 is a side sectional view illustrating the state that the conventional strain sensor is fixed to a detection target.

FIG. 8 is a perspective view of the conventional strain sensor, and FIG. 9 is a side sectional view illustrating the conventional strain sensor fixed to its detection target. Metal sensor substrate 1 has fixing holes 2 and 3. Strain-detecting element 4, consisting of a strain gauge, is disposed on the top face of sensor substrate 1. Strain-detecting element 4 includes element portion 5, and lead 6 electrically coupled to element portion 5 and protruding outward.

The operation of the conventional strain sensor as configured above is described next with reference to FIG. 9. A pair of internal threads 7 is provided in advance on detection target 8. Sensor substrate 1 is fixed to detection target 8 by screwing external threads 9 into internal threads 7 with sensor substrate 1 therebetween. The inner diameter of fixing holes 2 and 3 is slightly greater than the outer diameter of internal threads 7. This is to ensure the reliable fixing of sensor substrate 1 onto detection target 8, considering variations in the pitch of internal threads 7 provided on detection target 8. In this state, when an external force is applied to detection target 8, detection target 8 distorts, and sensor substrate 1 deforms in response to this distortion. The deformation of sensor substrate 1 is output from lead 6 as a change in voltage caused by a change in resistance of strain-detecting element 4 provided on the top face of sensor substrate 1. Accordingly, the external force applied to detection target 8 is detectable.

However, in the above conventional structure, a twisting force acts on external threads 9 when sensor substrate 1 is fixed to detection target 8 by screwing external threads 9 into internal threads 7. This twisting force produces internal stress in sensor substrate 1. As a result, strain-detecting element 4 distorts, and an output signal is generated even when no external force is applied to sensor substrate 1. Consequently, output signals from the strain sensor become inaccurate.

SUMMARY OF THE INVENTION

In the strain sensor of the present invention, a fixing member is composed of an upper washer and a lower washer. By sandwiching and holding a sensor substrate with these upper washer and lower washer, the fixing member is fixed onto the sensor substrate. A strain-detecting element is disposed on the sensor substrate. The strain sensor having this structure is thus fixed onto a detection target by means of the fixing member.

DETAILED DESCRIPTION OF THE PREFERRED EMBODIMENT

Figure 1:
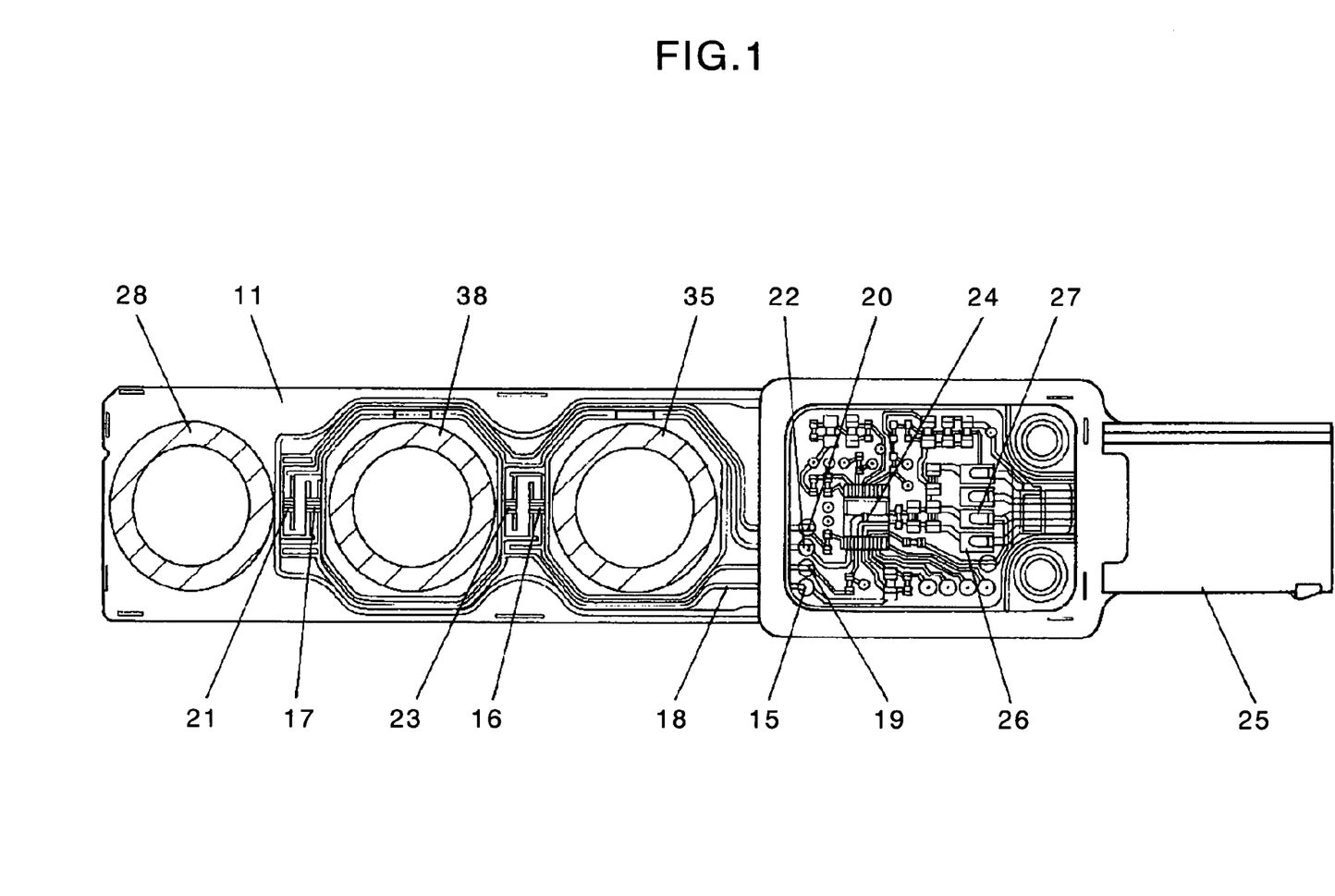
FIG. 1 is a top view of a strain sensor in accordance with an exemplary embodiment of the present invention.
Figure 2:
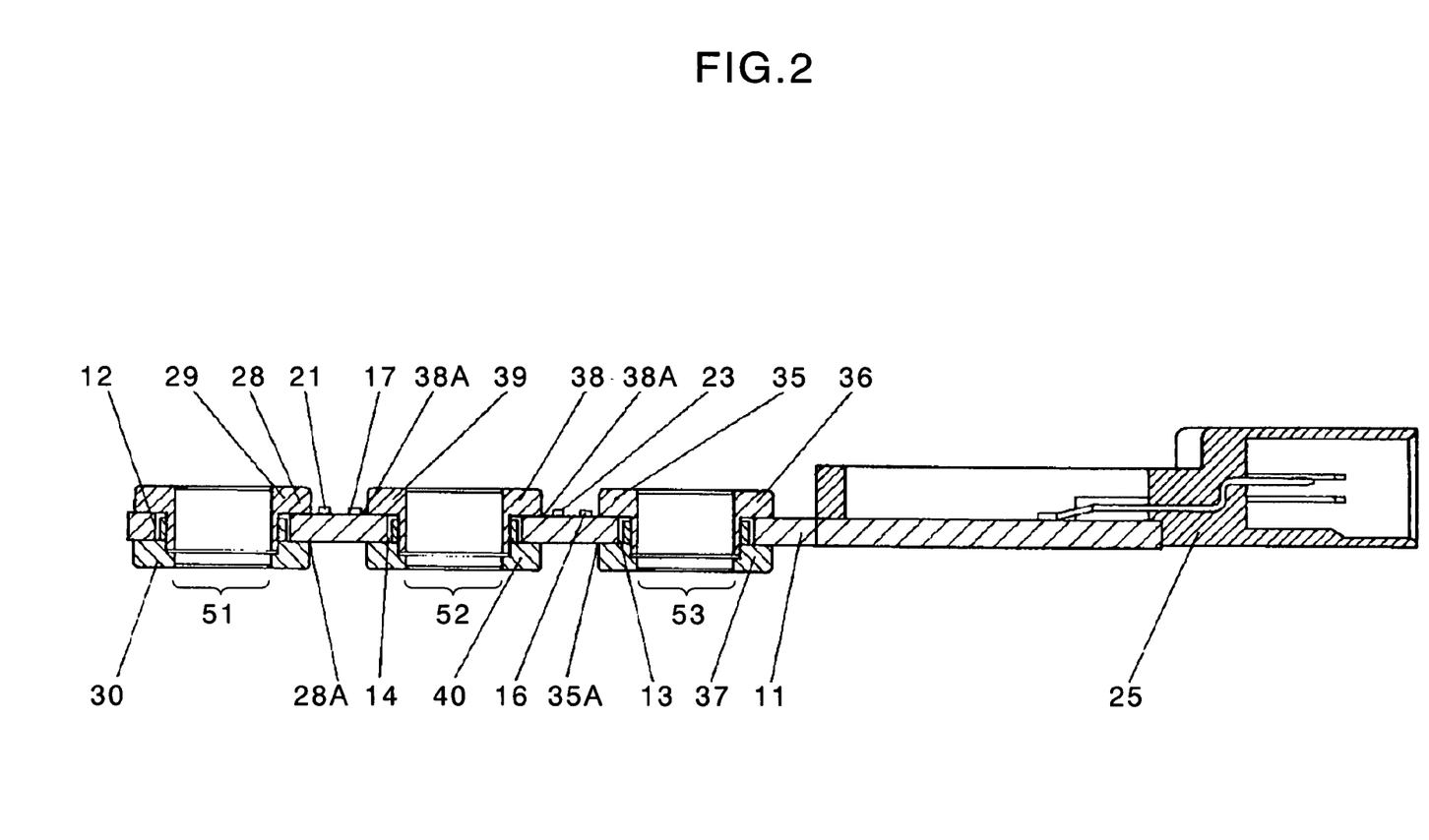
FIG. 2 is a side sectional view of the strain sensor shown in FIG. 1.
Figure 3:
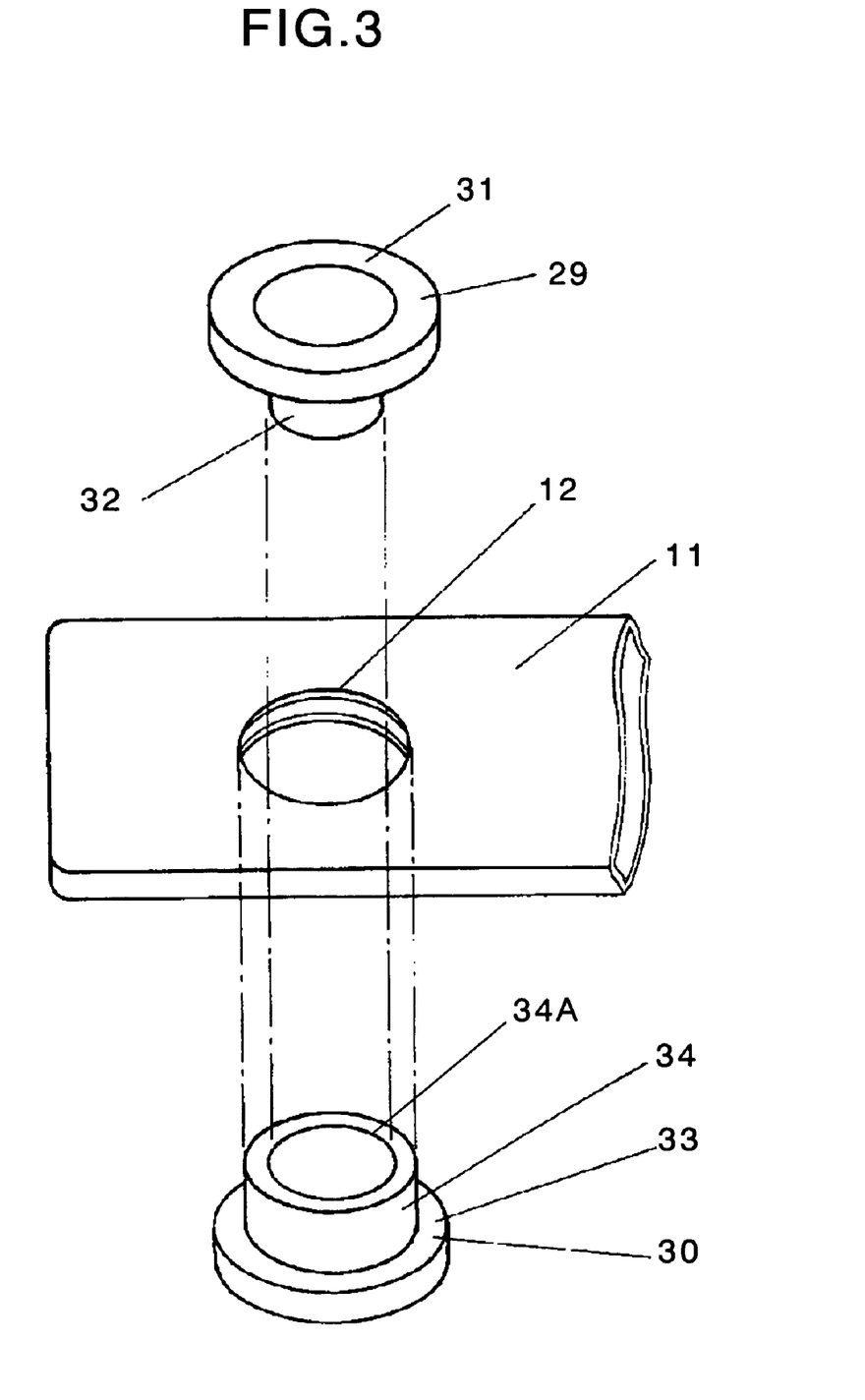
FIG. 3 is an exploded perspective view illustrating the state before fixing a first fixing member to a sensor substrate in the strain sensor shown in FIG. 1.
Figure 4:
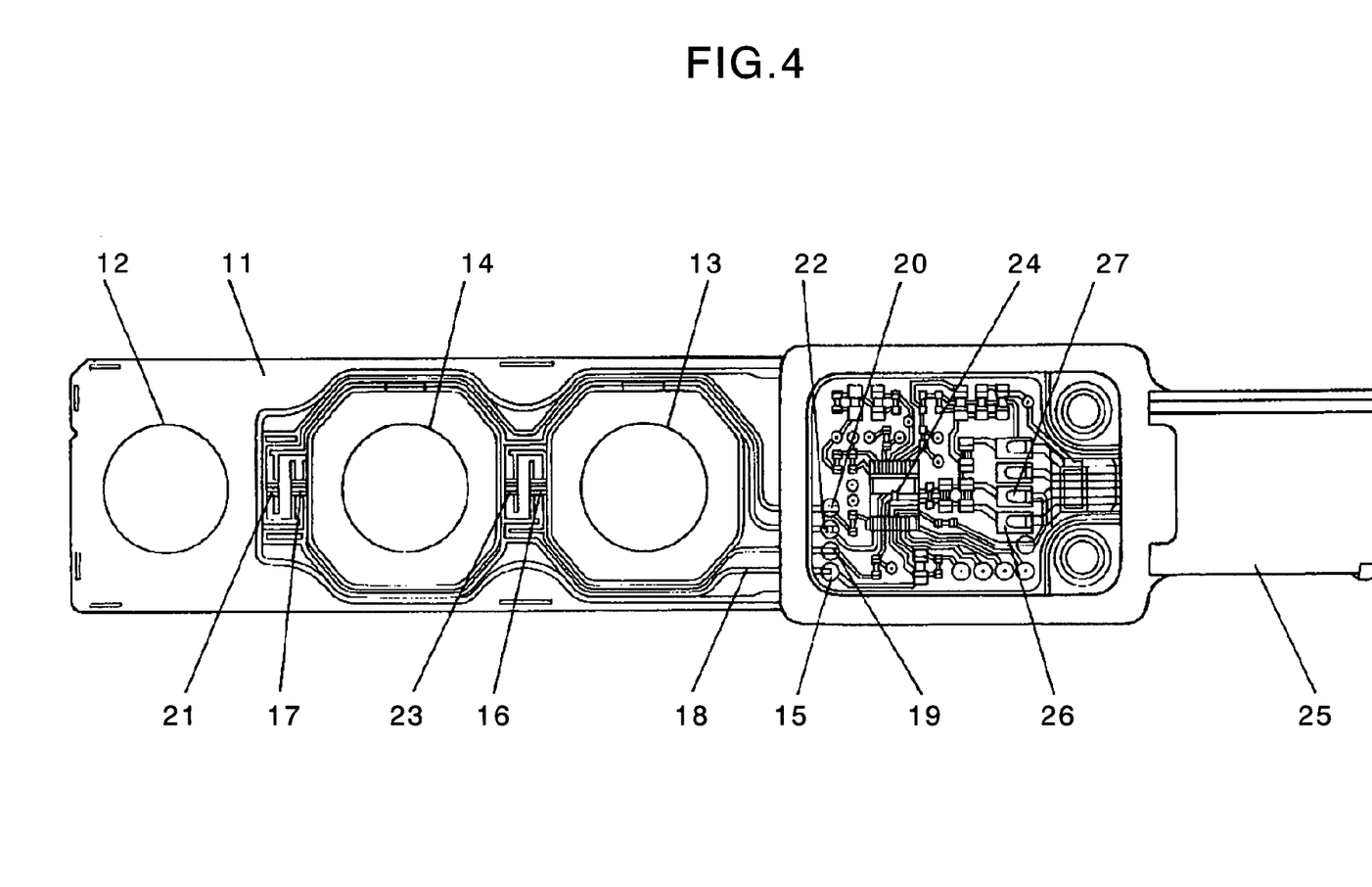
FIG. 4 is a top view of the sensor substrate in the strain sensor shown in FIG. 1.

FIG. 1 is a top view of a strain sensor in an exemplary embodiment of the present invention. FIG. 2 is a side sectional view of the strain sensor, and FIG. 3 is an exploded perspective view illustrating the state before fixing a first fixing member to a sensor substrate in the strain sensor. FIG. 4 is a top view of the sensor substrate in the strain sensor.

Sensor substrate (hereinafter "substrate") 11 has first fixing hole hereinafter "hole") 12 passing through from the top face (first face) to the bottom face (second face opposing the first face) at a first-end side. At the approximate center, substrate 11 also has second fixing hole (hereinafter "hole") 13 passing through from the top face to the bottom face. Still more, substrate 11 has detection hole (hereinafter "hole") 14 passing through from the top face to the bottom face at the approximate center between hole 12 and hole 13. Power electrode 15 is disposed at a second-end side of substrate 11. Power electrode 15 is electrically coupled to a first end of first strain-detecting element (hereinafter "element") 16 and a first end of second strain-detecting element (hereinafter "element") 17 via circuit pattern 18. A second end of element 16 is electrically coupled to first output electrode 19. A second end of element 17 is electrically coupled to second output electrode 20 and a first end of third strain-detecting element 21 (hereinafter "element"). A second end of element 21 is electrically coupled to GND electrode 22.

Fourth strain-detecting element (hereinafter "element") 23 is disposed on the top face of substrate 11. A first end of element 23 is electrically coupled to the second end of element 16 and first output electrode 19. A second end of element 23 is electrically coupled to GND electrode 22. In this way, elements 16, 17, 21, and 23; power electrode 15; output electrodes 19 and 20; GND electrode 22; and circuit pattern 18 configure a bridge circuit.

IC 24 is disposed on the top face of substrate 11 at the second-end side. IC 24 amplifies differential voltage between the voltage of first output electrode 19 and that of second output electrode 20, and outputs it outside through connector 25 provided at the second-end side of substrate 11.

External power electrode 26 is also disposed on the top face of substrate 11 at the second-end side. External power electrode 26 is electrically coupled to power electrode 15. External GND electrode 27 is also disposed on the top face of substrate 11, and external GND electrode 27 is electrically coupled to GND electrode 22.

As shown in FIG. 3, first fixing member (hereinafter "member") 28 is composed of first upper washer (hereinafter "washer") 29 made of metal and first lower washer (hereinafter "washer") 30 made of metal. Washer 29 contacts the top face of substrate 11, and washer 30 contacts the bottom face of substrate 11. Washer 29 includes round contact head 31 touching the top face of substrate 11 and insertion part 32 inserted into hole 12 on substrate 11. In the same way as washer 29, washer 30 also has round contact head 33 touching the bottom face of substrate 11 and insertion part 34 inserted into hole 12. Member 28 is fixed onto substrate 11 by press-fitting the outer periphery of insertion part 32 of washer 29 into inner periphery 34A of insertion part 34 of washer 30.

Insertion part 34 of washer 30 is inserted into fixing hole 12, fitting with a clearance in hole 12. When the outer periphery of insertion part 32 is press-fitted to the inner periphery of insertion part 34 in this state, washer 29 and washer 30 sandwich and hold substrate 11 without applying an internal stress to substrate 11. With this structure, member 28 is fixed onto substrate 11 without applying an internal stress to substrate 11. In addition, member 28 holds securely to substrate 11.

Second fixing member (hereinafter "member") 35 is also composed of second upper washer (hereinafter "washer") 36 made of metal and second lower washer (hereinafter "washer") 37 made of metal, in the same configuration as member 28. Detection member (hereinafter "member") 38 is composed of upper metal washer (hereinafter "washer") 39 of detecting portion and lower metal washer (hereinafter "washer") 40 of detecting portion. Member 28 and member 35 are fixed to a base (not illustrated) of a measurement target via holes 51 and 53. Member 38 is fixed to a part (not illustrated) of the measurement target where strain may occur via hole 52 so as to measure a strain force acting on the measurement target.

In the present exemplary embodiment, an external stress is applied to end 38A of member 38 which contacts substrate 11. A reaction force acts between end 28A of member 28 which contacts substrate 11 and end 35A of member 35 which contacts substrate 11.

Next, an assembly method of the strain sensor as configured above is described.

First, holes 12, 13, and 14 are formed by press working on a metal base material (not illustrated) prepared in advance. Next, glass paste (not illustrated) is printed on the top face of the base material (not illustrated), and then the base material is fired at about 850° C. for about 45 minutes to form substrate 11.

Next, metal-glazed carbon paste is printed on the top face of substrate 11, and fired at about 850° C. for about 45 minutes. Elements 16, 17, 21, and 23 are formed on the top face of substrate 11. Then, silver paste is printed on positions where power electrode 15, first output electrode 19, second output electrode 20, GND electrode 22, and circuit pattern 18 are to be provided, and fired at about 850° C. for about 45 minutes. In this way, power electrode 15, first output electrode 19, second output electrode 20, GND electrode 22, and circuit pattern 18 are formed. IC 24 is then mounted on the top face of substrate 11.

Next, insertion part 34 of washer 30 is inserted into hole 12 from the bottom, and then insertion part 32 of washer 29 is inserted into hole 12 from the top. The top face of contact head 33 of washer 30 is attached to the bottom face of substrate 11, and the bottom face of contact head 31 of washer 29 is attached to the top face of substrate 11. Here, member 28 is fixed to substrate 11 by press-fitting the outer periphery of insertion part 32 into the inner periphery of insertion part 34.

In this way, member 28 is fixed to substrate 11 by sandwiching and holding substrate 11 with washer 29 and washer 30. In this case, a force perpendicular to the thickness direction of substrate 11, generated by sandwiching and holding substrate 11 with washer 29 and washer 30, fixes member 28 onto substrate 11. Accordingly, no internal stress caused by twisting around hole 12 on substrate 11 is produced. Likewise, no continuous stress is applied to element 21 disposed near hole 12. Accordingly, a more accurate output signal from the strain sensor is achieved.

Next, in the same way as member 28, member 35 composed of washer 36 and washer 37 is fixed near hole 13 on substrate 11. Lastly, member 38 composed of washer 39 and washer 40 is fixed near hole 14 on substrate 11.

In this strusture, insertion part 34 of washer 30 is inserted into hole 12 on substrate 11 from the bottom, and then insertion part 32 of washer 29 is inserted into hole 12 from the top. Then, the top face of contact head 33 of washer 30 is attached to the bottom face of substrate 11. The bottom face of contact head 31 of washer 29 is attached to the top face of substrate 11. At this point, the outer periphery of insertion part 32 is press-fitted to the inner periphery of insertion part 34 so as to fix member 28 onto substrate 11.

Alternatively, insertion part 32 of washer 29 may be inserted into hole 12 from the bottom, and then insertion part 34 of washer 30 may be inserted into hole 12 from the top. In this case, the top face of contact head 31 of washer 29 is touched to the bottom face of substrate 11, and the bottom face of contact head 33 of washer 30 is touched to the top face of substrate 11. In this case, the inner periphery of insertion part 34 is press-fitted into the outer periphery of insertion part 32 so as to fix member 28 onto substrate 11. With this structure, the same effect as the structure previously described is achievable. The same applies to member 35 and member 38.

Figure 6:
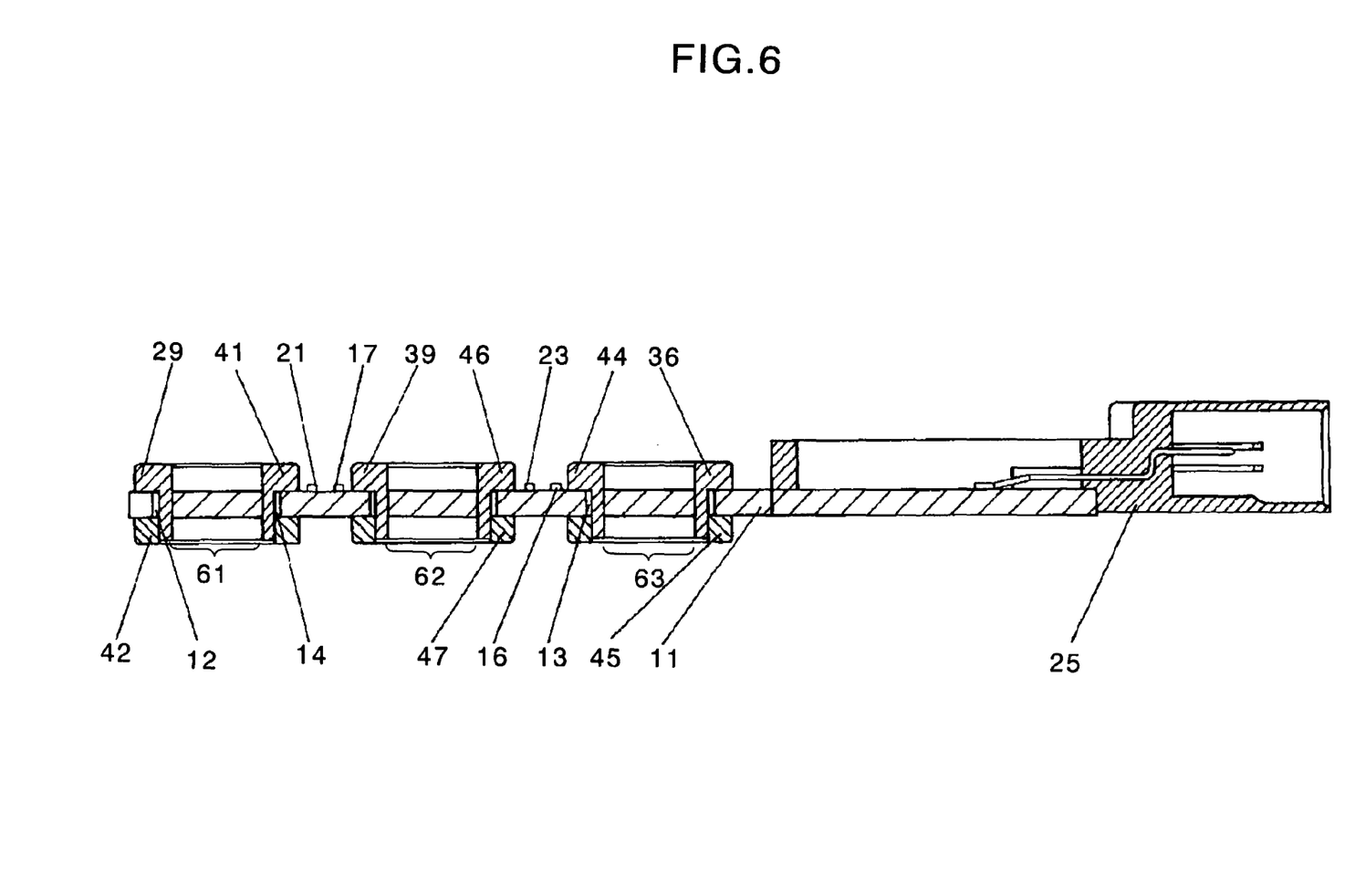
FIG. 6 is a side sectional view of another strain sensor in the exemplary embodiment of the present invention.
Figure 7:
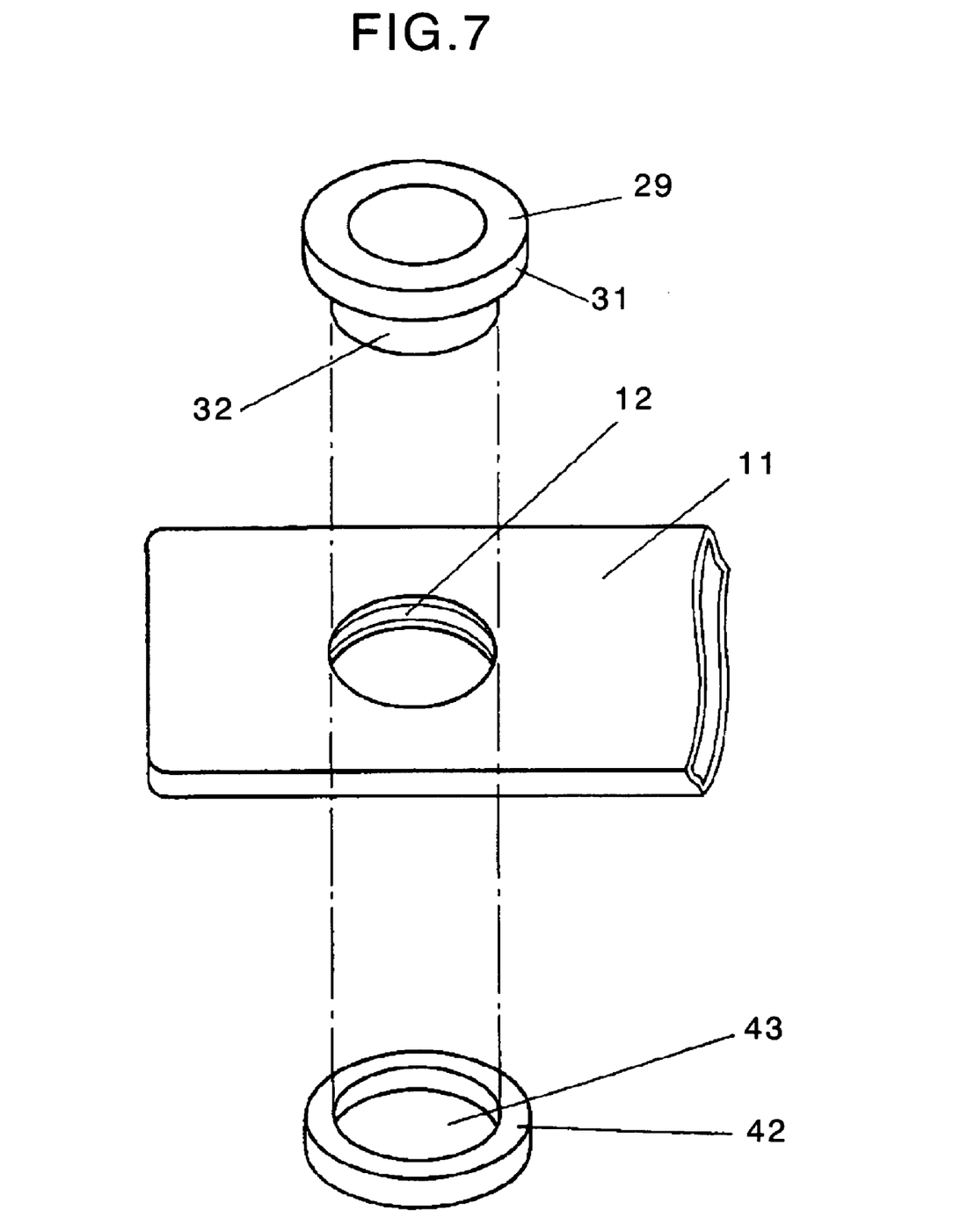
FIG. 7 is an exploded perspective view illustrating the state before fixing a first fixing member to the sensor substrate in the strain sensor shown in FIG. 6.

Next, another strain sensor in the exemplary embodiment of the present invention is described. FIG. 6 is a side sectional view of another strain sensor in the exemplary embodiment of the present invention. FIG. 7 is an exploded perspective view of the strain sensor before fixing a first fixing member onto a sensor substrate.

In this structure, the first fixing member (hereinafter "member") 41 is composed of first upper washer (hereinafter "washer") 29 made of metal and first lower washer (hereinafter "washer") 42 made of metal. Washer 29 contacts the top face of substrate 11, and washer 42 contacts the bottom face of substrate 11. The top face of washer 42 contacts the bottom face of substrate 11. Hole 43 passing through from the top face to the bottom face is formed in washer 42. Member 41 composed of washer 29 and washer 42 is fixed onto substrate 11 by press-fitting insertion part 32 of washer 29 into hole 43. In the same way as for member 41, second fixing member (hereinafter "member") 44 is composed of second upper washer (hereinafter "washer") 36 made of metal and second lower washer (hereinafter "washer") 45 made of metal. Detection member (hereinafter "member") 46 is also composed of upper metal washer (hereinafter "washer") 39 of detecting portion and lower metal washer (hereinafter "washer") 47 of detecting portion. Washers 36 and 39 have the same structure as washer 29, and washers 45 and 47 have the same structure as washer 42. First fixing member 41 and member 44 are fixed to a base (not illustrated) of the measurement target via holes 61 and 63. Member 46 is fixed via hole 62 to a portion (not illustrated) of the measurement target where strain is generated.

In this structure, insertion part 32 is provided on washer 29 and hole 43 is formed on washer 42; and insertion part 32 is press-fitted into hole 43. In this way, member 41 is fixed onto substrate 11. Accordingly, the entire washer 42 is press-fitted with washer 29. In addition, insertion part 32 of washer 29 can be thickened, contributing to improved strength of member 41.

In the structure of the strain sensor as configured above, first and second fixing members 41 and 44, and washers 29, 36, and 39 of member 46 have insertion parts. Holes are formed on washers 42, 45, and 47 of members 41, 44, and 46. The insertion parts of washers 29, 36, and 39 are respectively press-fitted into holes on washers 42, 45, and 47. Accordingly, members 41, 44, and 46 are fixed onto substrate 11. Alternatively, insertion parts may be provided on lower washers 42, 45, and 47, and holes may be provided on upper washers 29, 36, and 39. In this case, the insertion parts of washers 42, 45, and 47 are press-fitted into holes on washers 29, 36, and 39 so as to fix members 41, 44, and 46 onto substrate 11. This structure also demonstrates the same effect.

Figure 5:
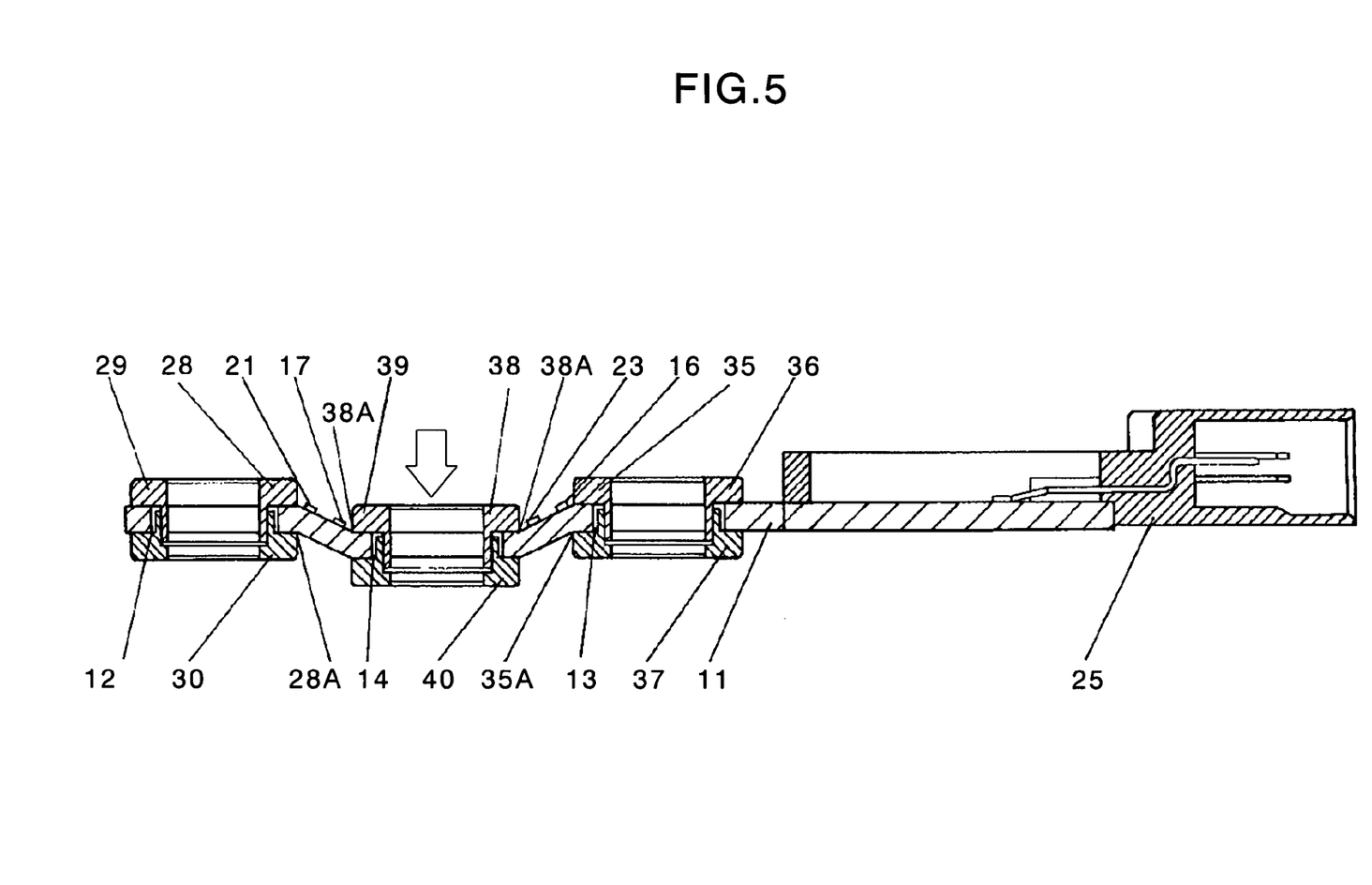
FIG. 5 is a side sectional view illustrating an operation state of the strain sensor shown in FIG. 1.

The operation of the strain sensor as configured and assembled above is described next with reference to FIG. 5. FIG. 5 is a side sectional view illustrating the operation state of strain sensor in the exemplary embodiment.

When an external force is applied to member 38 from the top as indicated by an arrow in FIG. 5, substrate 11 deforms. At this time, the external force is applied to end 38A of member 38. On the other hand, a reaction force acts to end 28A of member 28 and end 35A of member 35. A tensile stress is also applied to elements 16 and 21, increasing resistance of elements 16 and 21. On the other hand, a compression stress is applied to elements 17 and 23, reducing resistance of elements 17 and 23. Since a bridge circuit is formed among elements 16, 17, 21, and 23, IC 24 outputs a potential difference between first output electrode 19 and second output electrode 20 as the differential voltage through connector 25.

Here, the reaction force applied to member 28 includes a vector which rotates member 28 circumferentially, and thus it is conceivable that member 28 is rotated. However, as shown in FIG. 3, washer 29 has contact head 31 which touches the top face of substrate 11. In addition, washer 30 has contact head 33 which touches the bottom face of substrate 11. These contact heads 31 and 33 may be round. Accordingly, even though washer 29 rotates on the top face and washer 30 rotates on the bottom face of substrate 11 respectively in a circumferential direction, the positions of contact heads against substrate 11 do not deviate lengthwise on substrate 11 with respect to washers 29 and 30. Therefore, a bending stress applied to element 21 provided near member 28 does not change, allowing the strain sensor to maintain stable output characteristic.

In the exemplary embodiment, all washers are made of metal of high mechanical strength. However, the washers can be made of other materials with high mechanical strength, such as ceramics.

In the exemplary embodiment, the detection member is fixed to detection hole 14 so as to fix the detection member to the portion where strain is generated in the measurement target. However, if a member for fixing substrate 11 and the measurement target are provided separately, such as the case of a load cell, a structure that applies a force directly to a position equivalent to detection hole 14 on substrate 11, without providing detection hole 14 and the detection member would also be functional and is considered within the scope of the present invention.

In the exemplary embodiment, two fixing holes are provided. However, one fixing hole is acceptable, depending on structural design of attachment.

INDUSTRIAL APPLICABILITY

In the present invention, each fixing member is composed of an upper washer and a lower washer, and these upper and lower washers sandwich and hold a sensor substrate. Accordingly, the fixing member is fixed onto the sensor substrate. The fixing member is secured to the sensor substrate using a force perpendicular to the thickness direction of the sensor substrate, which is produced by sandwiching the sensor substrate with the upper washer and lower washer. This eliminates any internal stress produced by twisting around the fixing hole on the sensor substrate; no stress thus is continuously applied to the strain-detecting element. As a result, the present invention offers a strain sensor that generates an accurate output signal.

The invention claimed is:

1. A strain sensor comprising:
   a substrate in which a first hole passing through from a first face to a second face is provided, the first face and second face opposing each other;
   a strain-detecting element provided on at least one of the first face and the second face;
   a first fixing member including a first washer and a second washer, at least one of the first washer and the second washer comprising a first insertion part; and
   wherein said first insertion part extends into the first hole to attach the first fixing member to the substrate so that the substrate is sandwiched and held between the first washer and the second washer.

2. The strain sensor as defined in claim 1, wherein the first washer comprises the first insertion part, wherein the second washer has a second insertion part, and the first insertion part is inserted into the first hole and the second insertion part is press-fitted to an internal periphery of the first insertion part.

3. The strain sensor as defined in claim 1, wherein the first washer has a round first contact head attached to the first face of the substrate, and the second washer has a round second contact head attached to the second face of the substrate.

4. The strain sensor as defined in claim 1, wherein the first washer comprises the first insertion part, the second washer is provided with a washer hole, and the first insertion part is press-fitted in the washer hole.

5. A strain sensor comprising:
   a substrate in which a first hole passing through from a first face to a second face is provided, the first face and second face opposing each other;
   a strain-detecting element provided on at least one of the first face and the second face;
   a first fixing member including a first washer and a second washer, at least one of the first washer and the second washer being provided in the first hole such that the substrate is sandwiched and held between the first washer and the second washer and such that the first fixing member is attached to the substrate;
   wherein the substrate is provided with a second hole, and the strain sensor further has a detection member for receiving a strain force of a measurement target, the detection member comprising a third washer and a fourth washer, at least one of the third washer and the fourth washer being inserted into the second hole such that the detection member is fixed onto the substrate and the substrate is sandwiched and held by the third washer and the fourth washer.

6. The strain sensor as defined in claim 5, wherein the third washer has a first insertion part, the fourth washer has a second insertion part, the first insertion part is inserted into the second hole, and the first insertion part is press-fitted to an internal periphery of the second insertion part.

7. The strain sensor as defined in claim 5, wherein at least one of the first washer and the second washer has a cylindrical first insertion part provided in the first hole, and wherein at least one of the third washer and the fourth washer has a cylindrical second insertion part provided in the second hole.

8. The strain sensor as defined in claim 7, wherein the third washer has a round first contact head touching the first face of the substrate, and the fourth washer has a round second contact head touching the second face of the substrate.

9. The strain sensor as defined in claim 5, wherein the third washer has a first insertion part, and a washer hole is provided on the second washer, and the first insertion part is press-fitted into the washer hole.

10. A strain sensor comprising:
   a substrate in which a first hole passing through from a first face to a second face is provided, the first face and second face opposing each other;
   a strain-detecting element provided on at least one of the first face and the second face;
   a first fixing member including a first washer and a second washer, at least one of the first washer and the second washer being provided in the first hole such that the substrate is sandwiched and held between the first washer and the second washer and such that the first fixing member is attached to the substrate;
   wherein the substrate is provided with a second hole, and the strain sensor further has a second fixing member including a third washer and a fourth washer; and
   wherein at least one of the third washer and the fourth washer is inserted into the second hole such that the second fixing member is fixed onto the substrate and the substrate is sandwiched and held by the third washer and fourth washer.

11. The strain sensor as defined in claim 10, wherein the substrate is provided with a third hole, the strain sensor further has a detection member for receiving a strain force of a detection target, the detection member being provided between the first fixing member and the second fixing member and having a fifh washer and a sixth washer, wherein at least one of the fifth washer and the sixth washer is inserted into the third hole such that the detection member is fixed onto the substrate and the substrate is sandwiched and held by the fifth washer and the sixth washer.

12. The strain sensor as defined in claim 2, wherein a clearance is provided between an inner periphery of the first hole and an outer periphery of the first insertion part.

13. The strain sensor as defined in claim 6, wherein a clearance is provided between an inner periphery of the second hole and an outer periphery of the second insertion part.

14. The strain sensor as defined in claim 1, wherein the first insertion part is cylindrical.

15. The strain sensor as defined in claim 10, wherein at least one of the first washer and the second washer has a cylindrical first insertion part provided in the first hole, and wherein at least one of the third washer and the fourth washer has a cylindrical second insertion part provided in the second hole.

16. The strain sensor of claim 11, wherein at least one of the first washer and the second washer has a cylindrical first insertion part provided in the first hole, and wherein at least one of the third washer and fourth washer has a cylindrical second insertion part provided in the second hole, and wherein at least one of the fifth washer and the sixth washer has a cylindrical third insertion part provided in the third hole.

17. The strain sensor as defined in claim 2, wherein the second insertion part directly contacts an inner periphery of the first insertion part and is frictionally retained within the first insertion part.

18. The strain sensor as defined in claim 6, wherein the first insertion part directly contacts an inner periphery of the second insertion part and is frictionally retained within the first insertion part.

19. The strain sensor as defined in claim 1, wherein the first washer has a first contact head, the first washer has a first insertion part, the first insertion part is provided in the first hole, and the first contact head extends beyond the first insertion part in a width direction forming a lip that contacts the first face of the substrate.

20. The strain sensor as defined in claim 19, wherein the second washer has a second contact head, the second washer has a second insertion part, the second insertion part is provided in the first hole, and the second contact head extends beyond the second insertion part in a width direction forming a lip that contacts the second face of the substrate.

* * * * *